(12) United States Patent
Ionov

(10) Patent No.: US 6,462,860 B1
(45) Date of Patent: Oct. 8, 2002

(54) METHOD AND APPARATUS OF DETECTION OF PULSE POSITION MODULATED OPTICAL SIGNALS

(75) Inventor: Stanislav I. Ionov, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 134 days.

(21) Appl. No.: 09/586,836

(22) Filed: Jun. 5, 2000

(51) Int. Cl.[7] .............................. G02F 2/00; G02F 1/35
(52) U.S. Cl. ...................................... 359/325; 359/326
(58) Field of Search ................................. 359/325–332

(56) References Cited

U.S. PATENT DOCUMENTS

| | | | |
|---|---|---|---|
| 4,584,720 A | 4/1986 | Garrett ........................ 359/186 |
| 5,146,517 A | 9/1992 | Avrampoulos et al. ....... 385/39 |
| 5,208,455 A | 5/1993 | Nelson et al. .......... 250/227.19 |
| 5,307,428 A | 4/1994 | Blow et al. .................... 385/11 |
| 5,410,561 A | * 4/1995 | Ogawa ......................... 372/22 |
| 5,774,246 A | 6/1998 | Bülow ........................ 359/139 |
| 5,936,985 A | * 8/1999 | Yamamoto et al. ........... 372/38 |
| 5,999,283 A | 12/1999 | Roberts et al. ............. 359/108 |
| 6,323,990 B1 | * 11/2001 | Yamamoto et al. ......... 359/328 |

OTHER PUBLICATIONS

Wolfson, D., et al., "All–optical wavelength conversion scheme in SOA–based interferometric devices," *Electronics Letters*, vol. 36, No. 21, pp. 1794–1795 (Oct. 12, 2000).

G.P. Agraval, Nonlinear Fibers Optics (Academic Press, New York, 1995), pp. 556–559.

E. Yamada, K. Suzuki, and M. Nakazawa, "Subpicosecond optical demultiplexing at 10 GHz with zero–dispersion, dispersion–flattened, non–linear fiber loop mirror controlled by 500 fs gain–switched laser diode", Electronics Lett., vol. 30 (Nov. 1994), pp. 1966–8.

S. Bigo, O. Leclerc and E. Desurvire, All–Optical Fiber Signal Processing and Regeneration for Soliton Communications, IEEE J. Sel. Topics Quant. Electron., vol. 3 (Oct. 1997), pp. 1208–1223.

* cited by examiner

*Primary Examiner*—John D. Lee
(74) *Attorney, Agent, or Firm*—Ladas & Parry

(57) ABSTRACT

Demodulation of pulse position modulated optical signals is provided by a pair of coherent wavelength converters coupled to an optical correlator. A continuous wave optical source is fed into each coherent wavelength converter. Non-linear optical loop mirrors may be used to implement the coherent wavelength converters. One converter is controlled by an optical pulse position modulated signal, while the other converter is controlled by an optical clock signal that is synchronized to the pulse position modulated signal. Each converter produces an elongated top-hat optical pulse at the frequency of the continuous wave optical source. The optical correlator cross-correlates the outputs of the coherent wavelength converters to produce an output that is proportional to the time offset between a pulse position modulated pulse and its corresponding clock pulse.

34 Claims, 4 Drawing Sheets

METHOD AND APPARATUS OF DETECTION OF PULSE POSITION MODULATED OPTICAL SIGNALS

FIELD OF THE INVENTION

The present invention relates to pulse position modulation. More particularly, the present invention relates to detecting optical pulse position modulated signals using coherent correlation.

BACKGROUND OF THE INVENTION

Many satellite and terrestrial optical communication systems require transmission of analog optical signals. The straightforward way to address this need is to modulate the amplitude of an optical carrier. This approach, however, suffers from poor signal-to-noise ratio (SNR). It is well known that broadband modulation techniques, which utilize higher bandwidth than that of the transmitted waveform, may improve the SNR over that achieved with amplitude modulation. Pulse Position Modulation (PPM) is one of these techniques. In PPM, a temporal shift in the pulse position represents a sample of the transmitted waveform. The improvement in SNR near the Nyquist sampling frequency of a pulse position modulated signal over an amplitude modulated signal is shown below:

$$SNR_{ppm} \, SNR_{am}(t_p/\tau)^2$$

where $t_p$ is the temporal spacing between unmodulated pulses and $\tau$ is the pulse duration, respectively.

Conventional detection or demodulation of analog PPM optical signals, though, suffers from poor SNR at low frequencies. PPM signals are usually demodulated from the optical to electronic domain by a photodiode followed by a lowpass filter (LPF) that converts pulse position modulation to amplitude modulation. Such a demodulation technique is not capable of recovering the DC component, since the DC component is represented by a constant temporal shift of all pulses from their unmodulated positions. Moreover, the demodulated signals after the lowpass filter have very low amplitude at low frequencies. The amplitude increases linearly with frequency up to the Nyquist limit. Such frequency-dependent distortion is corrected by an integration circuit, which amplifies low-frequency noise accordingly, resulting in decreased SNR performance.

There exists a need in the art of a method and apparatus for detecting analog PPM optical signals at very low frequencies including DC. Moreover, the method and apparatus must provide SNR performance that does not degrade at lower frequencies.

SUMMARY OF THE INVENTION

An object of the present invention is to provide a method and apparatus for detecting a pulse position modulated optical signal at very low frequencies including DC. An additional object of the present invention is to provide pulse position modulation optical signal detection that does not exhibit degraded Signal-to-Noise performance at low frequencies.

A method and apparatus for detecting pulse position modulated optical signals is provided by an embodiment of the present invention having a clock source providing equally spaced optical clock pulses, a continuous wave optical source producing a continuous wave optical signal having a specific frequency, two coherent wavelength converters, and an optical correlator. An optical signal containing a pulse position modulated signal controls one coherent wavelength generator to produce a first stream of coherent pulses, preferably top hat shaped, at the frequency of the continuous wave. The clock source controls the other coherent wavelength generator to produce a second stream of coherent pulses, again preferably top hat shaped, also at the frequency of the continuous wave. The two pulse streams are cross-correlated by the optical correlator to produce an output whose value is proportional to the cross-correlation product.

An alternative embodiment of the present invention has a means for receiving an optical signal that contains both an optical pulse position modulated analog signal component and a clock signal component of equally spaced optical pulses, a means for splitting the optical signal into its two separate optical signal components, a continuous wave optical source producing a continuous wave optical signal having a specific frequency, two coherent wavelength converters, and an optical correlator. The optical signal containing the pulse position modulated signal controls one coherent wavelength generator to produce a first stream of coherent pulses, preferably top hat shaped, at the frequency of the continuous wave. The optical signal containing the clock signal of equally spaced optical pulses controls the other coherent wavelength generator to produce a second stream of coherent pulses, again preferably top hat shaped, also at the frequency of the continuous wave. The two pulse streams are cross-correlated by the optical correlator to produce an output whose value is proportional to the cross-correlation product.

Another embodiment of the present invention provides an apparatus for detecting temporal displacement between optical pulses in a first optical signal and optical pulses in a second optical signal wherein the first optical signal is synchronized with the second optical signal, and the apparatus comprises: a continuous wave optical source, a first coherent wavelength converter having inputs responsive to the first optical signal and to the continuous wave optical signal and producing a first coherent pulsed output; a second coherent wavelength converter having inputs coupled to the second optical signal and to the continuous wave optical signal and producing a second coherent pulsed output; and a coherent correlator having inputs coupled to the outputs of the first coherent wavelength converter and the second coherent wavelength converter and producing an output proportional to the first coherent pulsed output correlated with the second coherent pulse output. This output is also proportional to the temporal displacement between the optical pulses in the two streams.

Another embodiment of the present invention provides a method for detecting temporal displacement between optical pulses in a first optical signal and optical pulses in a second optical signal wherein the first optical signal is synchronized with the second optical signal, and the method comprises the steps of: generating a continuous wave optical signal; applying the continuous wave optical signal to a first coherent wavelength generator; providing the first optical signal to the first coherent wavelength generator; controlling the first coherent wavelength generator with the first optical signal so as to produce a first coherent pulse stream; applying the continuous wave optical signal to a second coherent wavelength generator; providing the second optical signal to the second coherent wavelength generator; controlling the second coherent wavelength generator with the second optical signal so as to produce a second coherent pulse stream; and cross-correlating the first coherent pulse stream with the second coherent pulse stream to produce an output which is proportional to the temporal displacement between the optical pulses in the two streams.

DETAILED DESCRIPTION OF PREFERRED EMBODIMENTS

The present invention now will be described more fully hereinafter with reference to the accompanying drawings, in which preferred embodiments of the invention are shown. This invention may be embodied in many different forms and should not be construed as limited to the embodiments set forth herein.

Figure 1:
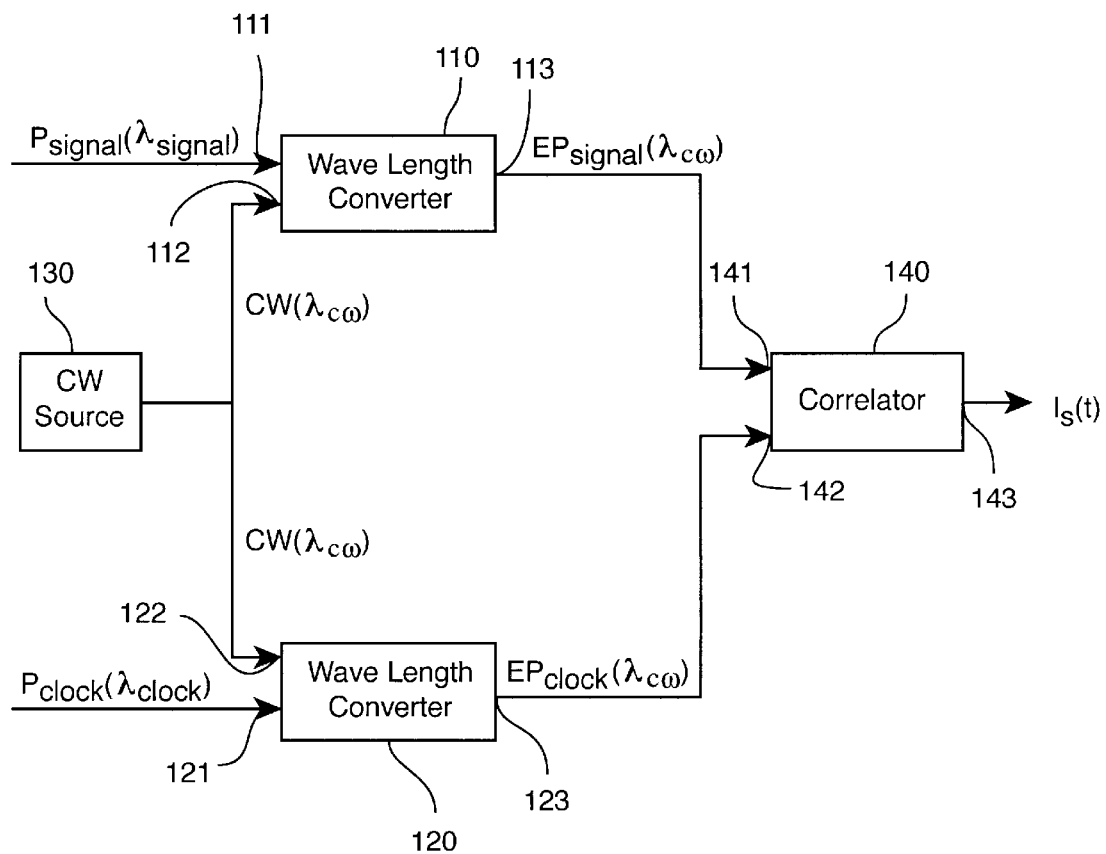
FIG. 1 shows a schematic representation of a method and apparatus for detection of optical pulse position modulated signals in accordance with the present invention
Figure 2:
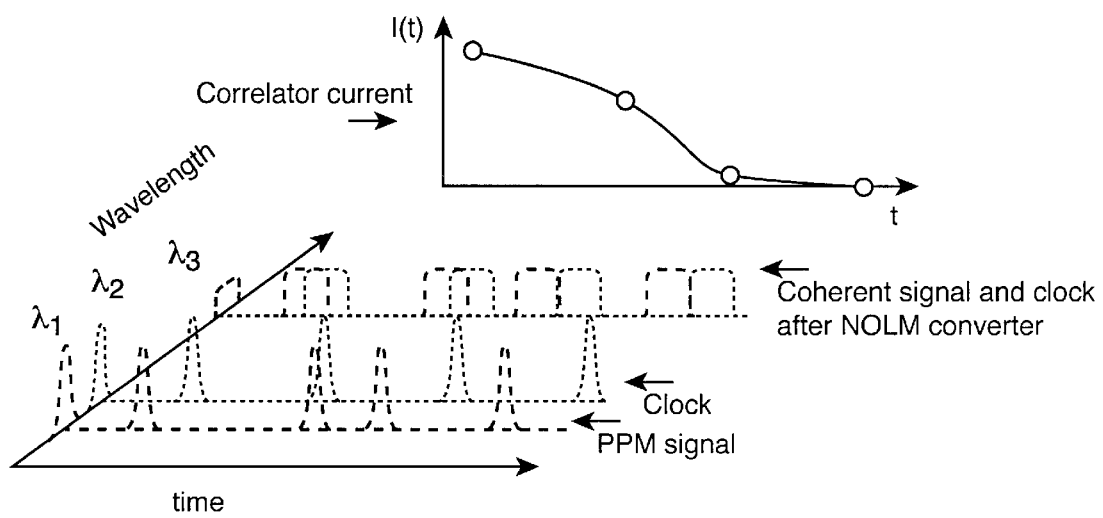
FIG. 2 shows a graphical view of the transformation of the optical pulses by each coherent wavelength generator and the resulting cross-correlation product

A schematic representation of apparatus and methods for detecting a pulse positioned modulated optical signal is shown in FIG. 1. The apparatus and method are based on converting two-color signal and clock pulses into coherent single color trains of top-hat pulses followed by their cross-correlation. The cross-correlation translates the temporal shift between the signal and clock pulses into electrical output.

Referring to FIG. 1, a first coherent wavelength converter 110 has a pulsed optical signal input 111, a continuous wave optical signal input 112, and a coherent pulse output 113. An optical signal $P_{sig}(\lambda_{sig})$ contains a stream of pulse position modulated (PPM) pulses at an optical wavelength $\lambda_{sig}$. $P_{sig}(\lambda_{sig})$ is input to the first coherent wavelength converter 110 at the pulse optical signal input 111. Still referring to FIG. 1, a second coherent wavelength converter 120 has a pulsed optical signal input 121, a continuous wave optical input 122, and a coherent pulse output 123. An optical clock signal $P_{clk}(\lambda_{clk})$ contains a stream of optical pulses at an optical wavelength $\lambda_{clk}$. Preferably, the optical pulses in the optical clock signal are equally spaced or nearly equally spaced in time. $P_{clk}(\lambda_{clk})$ is input to the second coherent wavelength converter 120 at the pulsed optical signal input 121. The PPM pulses and the optical clock pulses may have the same or different optical wavelengths. The output optical PPM pulses are synchronized and are coherent with the output optical clock pulses since both derive their optical frequency and phase from that of a single continuous-wave source.

Still referring to FIG. 1, a continuous wave optical source 130 provides a continuous wave optical signal at an optical wavelength $\lambda_{cw}$. The continuous wave optical signal is input to the continuous wave input 112 of the first coherent wavelength converter 110 and the continuous wave input 122 of the second coherent wavelength converter 120. The first coherent wavelength converter 110 outputs a stream of elongated optical pulses $EP_{sig}(\lambda_{cw})$ at the wavelength of the continuous wave signal. The temporal position of each elongated optical pulse is dependent upon the temporal position of each PPM pulse. Similarly, the second coherent wavelength converter outputs a stream of elongated optical pulses $EP_{clk}(\lambda_{cw})$ at the wavelength of the continuous wave signal and whose temporal position is dependent upon the temporal position of each clock pulse. Preferably, the elongated optical pulses have a "top-hat" temporal shape, where each pulse exhibits an extended period of nearly constant amplitude bounded by rise and fall times which are fast relative to the period of constant amplitude.

Still referring to FIG. 1, a coherent correlator 140 has a first optical input 141, a second optical input 142, and a current output 143. The first coherent wavelength converter output 113 connects to the first optical input 141 of the coherent correlator and the second coherent wavelength converter output 123 connects to the second optical input 142 of the coherent correlator 140. The coherent correlator 140 provides an output 143 that is proportional to the cross-correlation product of the $EP_{sig}$ and $EP_{clk}$. This cross-correlation product is also proportional to the offset in time between each PPM pulse and its corresponding clock pulse. Thus, the output of the coherent correlator provides a demodulated analog signal corresponding to the original analog pulse position modulated signal.

The coherent wavelength converters 110, 120 of the present invention are preferably based on a nonlinear optical loop mirror (NOLM) with a control loop. NOLMs are well known in the art and can be constructed by splicing together commercial fibers and couplers. U.S. Pat. No. 5,208,455, issued to B. P. Nelson et al. on May 4, 1993, describes the construction of a typical nonlinear optical loop mirror. Non-linear optical loop mirrors are also further described by S. Bigo, O. Leclerc, and E. Desurvire in "All Optical Fiber Signal Processing and Regeneration for Soliton Communications," IEEE J. Sel. Topics Quant. Electron., Vol. 3 (1997), p 1208.

In the present invention, the single frequency continuous wave source 130 operating at an optical wavelength $\lambda_{cw}$, feeds into both NOLMs. Since both NOLMs are completely symmetrical, the continuous wave radiation is reflected completely in the absence of control radiation. The signal and clock pulses at wavelengths $\lambda_{sig}$ and $\lambda_{clk}$, respectively, act as control signals in the NOLMs. For the NOLMs to operate correctly, the wavelengths of the control signals $\lambda_{sig}$ and $\lambda_{clk}$ must be different than that of the continuous wave radiation at $\lambda_{cw}$. The control signals add a non-linear phase shift, $$\phi_{NL}=\gamma P_c L_w \qquad (1)$$

In Equation (1), $\gamma$ is the non-linear constant of the fiber, typically approximately equal to 10 W$^{-1}$/km, $P_c$ is the peak intensity of the control pulse and $L_w=\tau v_{cw}v_c/|v_{cw}-v_c|$ is the walk-off length, where $\tau$, $v_{cw}$ and $v_c$ are the duration of control pulse and group velocities of continuous wave and control beams, respectively. Equation (1) assumes negligible dispersion of the control pulse and noticeable dispersion between $\lambda_{sig,clk}$ and $\lambda_{cw}$, which is the case if $L_w<L<<L_d=\tau^2/|\beta_2|$, where L is the length of the NOLM and $\beta_2$ is the fiber dispersion at the control wavelength. These conditions are easily satisfied by choosing fibers with zero dispersion at the control wavelength. As a result of different propagation speeds of the continuous wave beam and control pulse, the latter slides along the former as they propagate along the fiber loop.

Assuming $\delta t \gg \tau$, a long temporal slice of the continuous wave beam acquires a non-linear phase shift at the end of the fiber loop as shown in Equation (2).

$$\varphi_{NL}(t) = \gamma P_c L_w \sqrt{\pi} \left[ erf\left(\frac{t}{\tau}\right) - erf\left(\frac{t - \delta t}{\tau}\right) \right] \quad (2)$$

where $\delta t = L(1/v_{cw} - 1/v_c)$. The optical radiation coupled out of the NOLM is nearly rectangular phase-shifted slices of continuous wave radiation. The temporal shape of the out-coupled beam at $\lambda_{cw}$ is given by $$E(t) = E_{cw} \sin(\varphi_{NL}/2) \quad (3)$$

resulting in the pulses having a "top-hat" shape. After the NOLM, any residual control radiation at the wavelength of the control signal may be removed by an optical filter.

Figure 4:
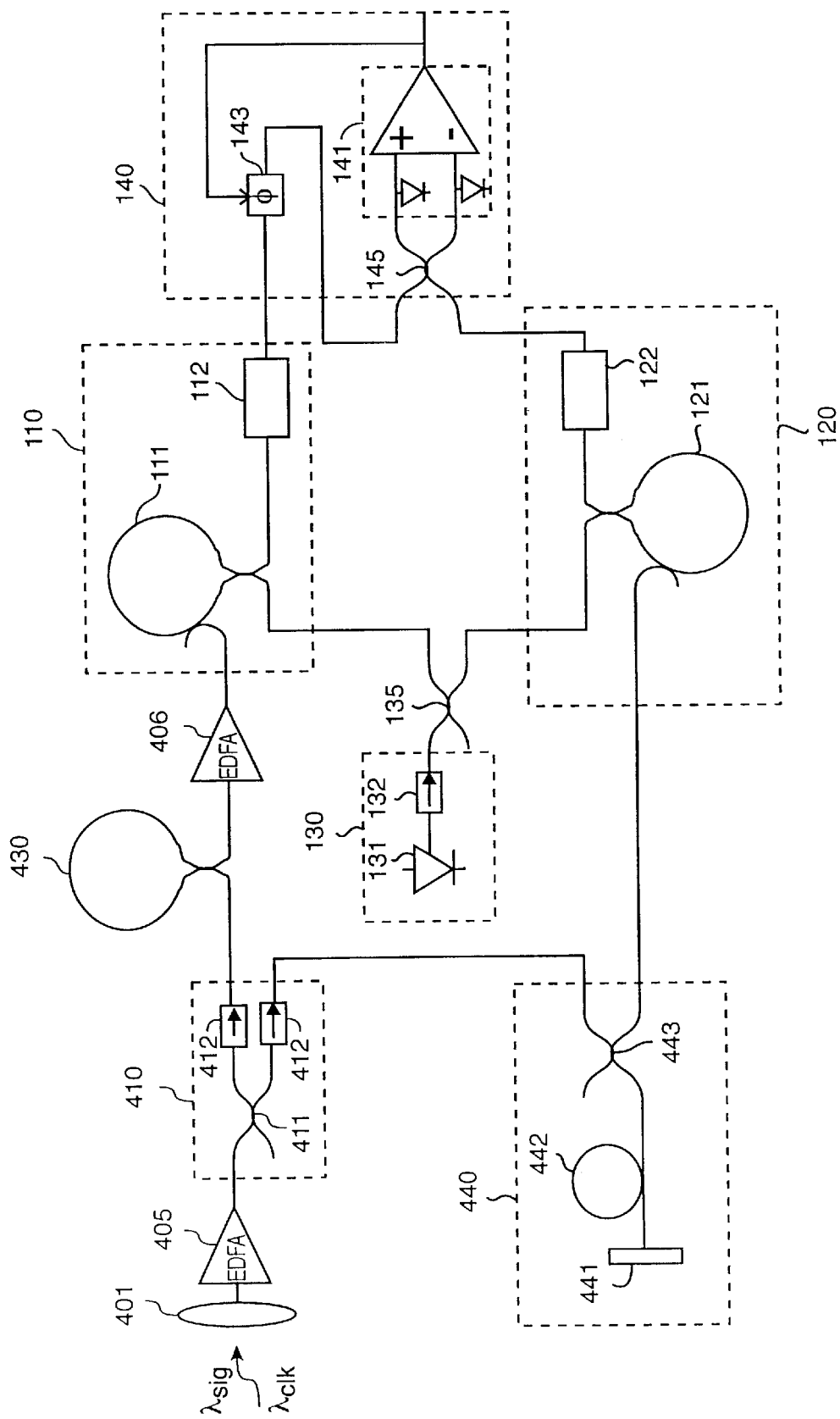
FIG. 4 shows a schematic representation an embodiment of the present invention where a pulse position modulated signal and a clock signal are contained in the same optical signal.

The coherent trains of elongated signal and clock pulses at the continuous wave frequency $\lambda_{cw}$ are combined in an optical correlator. Preferably, the optical correlator consists of a 3 dB coupler and a balanced detector, as shown in FIG. 4. The electric current of the correlator is given by:

$$I = \int_{-\infty}^{\infty} E_{sig}(t - \Delta t) E_{clk}(t) dt, \quad (4)$$

where $\Delta t$ is the temporal shift between the signal and control pulses and $E_{sig,clk}(t)$ are given by Eqs. (2), (3).

Figure 3A:
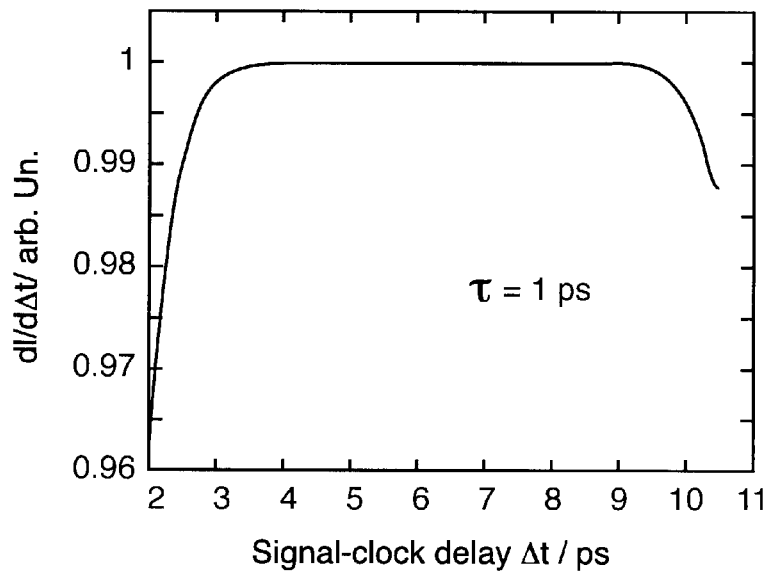
FIG. 3A is a graph of simulated current output for an embodiment of the present invention where pulses within an optical pulse position modulated signal are 1 picosecond in duration.
Figure 3B:
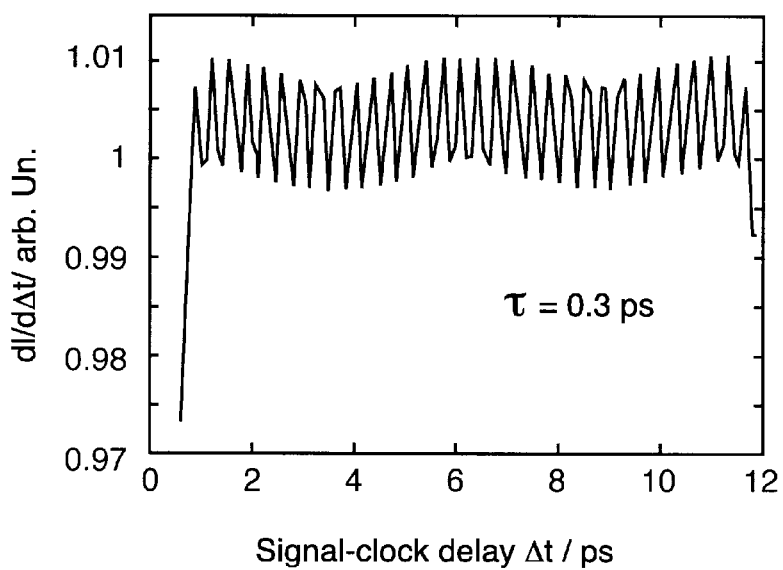
FIG. 3B is a graph of simulated current output for an embodiment of the present invention where pulses within an optical pulse position modulated signal are 0.3 picoseconds in duration.

For top-hat pulses, the current output by the correlator is linearly proportional to the delay $\alpha t$ as shown in the results of numerical simulations presented in FIG. 3A and FIG. 3B for Gaussian pulses of $\tau = 1$ picosecond and $\tau = 0.3$ picosecond duration, respectively. In the calculations, values of L=500 m, $\delta t = 12$ ps, $\gamma = 10$ W$^{-1}$/km, and P$_c$=2 W and 6 W for 1 ps and 0.3 ps pulses, respectively, were used. Under these conditions, $L_w = L\tau/\delta t = 50$ m and 17 m for 1 ps and 0.3 ps pulses, respectively, and the maximum phase shift is $\sqrt{\pi} L_w \gamma P_c = 1.77$ rad and the uncoupled continuous wave power reaches 0.6 $P_{cw}$. The results of the calculations show that the current deviates from linear dependence from $\Delta t$ by less than 1% for a large range of $\Delta t$, namely for $2\tau < \Delta t < \delta t - 2\tau$. The oscillations shown in FIG. 3B are known to be derived from numerical roundoff errors.

In the present invention, the top hat pulse created by a specific PPM pulse must not overlap the top hat pulse created by a clock pulse for a preceding or a following PPM period. Therefore, the maximum temporal shift for PPM pulses $\Delta t_{Pmax}$ must be smaller than the duration of the top-hat pulses $t_{TH}$ created by the coherent wavelength generators, and the sum of the two values, $\Delta t_{pmax} + t_{TH}$, must be less than $t_p$, the interval between the clock pulses. Hence, $\Delta t_{pmax} < t_p/2$, so the PPM signal must have a modulation index M of less than 0.5. Therefore, the individual pulses of the PPM signal are shifted from their non-modulated positions of $\Delta t_0 = t_p/4$ within the time slot of $-t_p/4 < \Delta t < t_p/4$.

In FIGS. 3A and 3B, dI is the current increment caused by the incremental shift is pulse position $d\Delta t$. It is desirable for $dI/d\Delta t$ to be independent of $\Delta t$. This corresponds to a perfectly linear detector. The simulation results shown in FIGS. 3A and 3B indicate that the pulse position modulation detector provided by the present invention is linear over almost all of its dynamic range of $0 < \Delta t < t_p/2$. In this range, $\Delta t = t_p/4$ corresponds to an unmodulated signal or the position of the clock signal. Note that the choice of the $\Delta t$ reference is arbitrary. Of importance, however, is that the dynamic range of the pulse position modulated signal is set to operate in the linear portion of the detector.

Another embodiment of the present invention provides for optical detection of pulse position modulated signals in which the same optical link provides both the signal and clock pulses. FIG. 4 shows a block diagram of this embodiment.

Referring to FIG. 4, an optical link 401 couples two multiplexed optical signals, a pulse position modulated analog signal with a first wavelength $\lambda_{sig}$ and a clock signal consisting of equally-spaced pulses with a second wavelength $\lambda_{clk}$ into a receiver provided by the present invention. A fiber coupler or other devices known in the art may be used to couple the signals into the receiver. If the signals are radiating in free space, an optical lens or other focusing device may be used to couple the signals into the receiver. The signals may be amplified by an optical amplifier 405. Optical amplifiers are well known in the art. For example, an erbium doped fiber amplifier would provide the necessary level of amplification. The signals are then demultiplexed by a wavelength division multiplexer/demultiplexer (WDM) 410. Wavelength division multiplexer/demultiplexers are also known in the art. FIG. 4 shows a WDM implemented with a 50/50 coupler 411 and a pair of Faraday isolators 412.

Since the clock is used for synchronization purposes only, it is sufficient to dedicate only a small fraction of the overall optical power to the clock signal. A clock signal with power as low as 10% to 20% of the overall optical power would be sufficient. A lower power clock signal may be regenerated in an optical clock recovery circuit 440, for example, in a seeded mode-locked laser, as described by E. Yamada, K. Suzuki, and M. Nakazawa, "Subpicosecond Optical Demultiplexing at 10 GHz with Zero-dispersion, Dispersion-flattened, Non-linear Fiber Loop Mirror Controlled by 500 fs Gain-switched Laser Diode," Electronics Letters, Vol. 30, p1966. In FIG. 4, the clock recovery circuit is implemented by a fiber laser 442 coupled to a piezo-electric transducer 441 and a 50/50 coupler 443. The clock recovery circuit provides for rectification and amplification of low power optical clock pulses.

The pulse position modulated signal may also be regenerated. In FIG. 4, an optical limiter 430 followed by an optical amplifier 406 are shown as one approach for regeneration of the pulse position modulated signal. Other approaches for optical pulse regeneration are also known in the art.

As described previously, a continuous wave source 130 provides an optical continuous wave signal at $\lambda_{cw}$. Continuous wave sources are well known in the art. One such source comprises a semiconductor laser 131 followed by a Faraday isolator 132. A 50/50 coupler 135 is used to provide the continuous wave signal to both a first coherent wavelength converter 110 and a second coherent wavelength converter 120.

The first coherent wavelength converter 110 receives the pulse position modulated signal and the continuous wave signal as inputs and produces a top-hat pulse at the frequency of the continuous wave signal. As described above, a coherent wavelength converter may comprise a nonlinear optical mirror 111. A filter 112 may be used to eliminate any residue at the frequency of the pulse position modulated signal.

Similarly, the second coherent wavelength converter 120 receives the clock signal and the continuous wave signal as inputs and produces a top-hat pulse at the frequency of the continuous wave signal. As described above, a coherent wavelength converter may comprise a nonlinear optical mirror 121. A filter 122 may be used to eliminate any residue at the frequency of the clock signal.

The top-hat pulses produced by the first coherent wavelength converter 110 and the second coherent wavelength converter 120 are coupled into an optical correlator 140. One optical correlator known in the art consists of a 50/50 (or 3 dB) coupler 145 and a balanced detector 141, which may be provided by devices well known in the art. The correlator also contains a phase shifter 143 to compensate for possible temperature-related or other unwarranted phase shifts between the top-hat pulses produced by the first and second coherent wavelength converters. The balanced detector 141 produces a current output that is proportional to the cross-correlation product of the pulse position modulated signal top hat pulse and the clock signal top hat pulse. The current output also controls the amount of phase shift applied by the phase shifter 143 to maximize the magnitude of averaged electrical current at the correlator's output. A very fast balanced detector would provide a sampled version of the original analog waveform, such that a low pass filter would be required to provide a continuous waveform. Generally, however, the low pass function is inherent in the operation of the balanced detector such that a continuous waveform is produced at the output of the detector.

The present invention is not limited to the detection of pulse position modulated signals. The method and apparatus of the present invention may also be used to detect and output the temporal displacement between any two streams of optical pulses. For use with the present invention, the two streams of optical pulses must derive their optical frequency and phase from a single continuous-wave source, and are thus synchronized with each other. In this embodiment of the present invention, one stream would be input as if it were the pulse position modulated signal previously described and the other stream would be input as if it were the optical clock signal previously described. If one of the optical pulse streams is periodic or nearly periodic, and the maximum offset in time for pulses in the other stream is less than one-half the period, the output provided by this embodiment of the present invention will be similar to that provided for a pulse position modulated signal. If the optical pulse streams deviate from these conditions, detection of temporal displacement will suffer. All other aspects of the present invention as previously described will also apply to this application for detecting the temporal displacement of pulses within two optical pulse streams.

From the foregoing description, it will be apparent that the present invention has a number of advantages, some of which have been described above, and others of which are inherent in the embodiments of the invention described above. Also, it will be understood that modifications can be made to the optical pulse position modulation receiver and method for detecting pulse position modulation signals described above without departing from the teachings of subject matter described herein. As such, the invention is not to be limited to the described embodiments except as required by the appended claims.

What is claimed is:

1. An apparatus for detecting a pulse position modulated optical signal comprising:
    a clock source providing optical clock pulses synchronized to said pulse position modulated optical signal;
    a continuous wave optical source producing a continuous wave optical signal;
    a first coherent wavelength converter, said first coherent wavelength converter having a first input responsive to said pulse position modulated signal and a second input responsive to said continuous wave optical signal and producing a first coherent pulsed output;
    a second coherent wavelength converter, said second coherent wavelength converter having a first input coupled to said optical clock pulses and a second input coupled to said continuous wave optical signal and producing a second coherent pulsed output; and
    a coherent correlator having inputs coupled to the outputs of said first coherent wavelength converter and of said second coherent wavelength converter and producing an output proportional to said first coherent pulsed output correlated with said second coherent pulse output.

2. An apparatus according to claim 1 wherein said optical clock pulses are equally spaced or nearly equally spaced in time.

3. An apparatus according to claim 1 wherein said first coherent pulsed output is a stream of optical pulses with each pulse having a top-hat temporal shape and said second coherent pulsed output is a stream of pulses of optical pulses with each pulse having a top-hat temporal shape.

4. An apparatus according to claim 1 wherein said output of said coherent correlator is linearly proportional to the difference in time between a pulse in said pulse position modulated signal and an optical clock pulse synchronized to said pulse in said pulse position modulated signal.

5. An apparatus according to claim 1 wherein said first coherent wavelength converter comprises a first non-linear optical loop mirror and said second coherent wavelength converter comprises a second non-linear optical loop mirror.

6. An apparatus according to claim 5 further comprising:
    a first optical filter coupled to an output of said first non-linear optical loop mirror; and,
    a second optical filter coupled to an output of said second non-linear optical loop mirror.

7. An apparatus according to claim 1 wherein said coherent correlator comprises:
    a 50/50 coupler with two inputs and two outputs;
    a balanced detector having inputs coupled to said two outputs of said 50/50 coupler and having an output; and,
    an optical phase shifter having an input and an output, said output of said optical phase shifter connected to one of said two inputs of said 50/50 coupler, said optical phase shifter providing a phase shift controlled by said output of said balanced detector.

8. The apparatus according to claim 1 farther comprising:
    an optical limiter, said optical limiter having an input responsive to said pulse position modulated optical signal and an output connected to said first input of said first coherent wavelength converter.

9. The apparatus according to claim 8 further comprising:
    an optical amplifier, said optical amplifier connected between said output of said optical limiter and said first input of said first coherent wavelength converter.

10. The apparatus according to claim 1 further comprising:
    an optical clock recovery means, said optical clock recovery means providing rectification and amplification of said optical clock pulses and having an input responsive to said optical clock pulses and producing an output connected to said first input of said second coherent wavelength converter.

11. An optical pulse position modulation receiver comprising:
    means for coupling an optical signal to said receiver, said means having an optical output, wherein said optical signal contains an optical pulse position modulated signal and a clock signal consisting of optical pulses;

an optical signal demultiplexer, said optical signal demultiplexer receiving said optical signal and producing a first optical demultiplexer output containing said optical pulse position modulated signal and a second optical demultiplexer output containing said clock signal;

a continuous wave optical source producing a continuous wave optical signal;

a first coherent wavelength converter, said first coherent wavelength converter having a first input coupled to said first optical demultiplexer output and a second input coupled to said continuous wave optical signal and producing a first coherent pulsed output;

a second coherent wavelength converter, said second coherent wavelength converter having a first input coupled to said second optical demultiplexer output and a second input coupled to said continuous wave optical signal and producing a second coherent pulsed output; and, a coherent correlator having inputs coupled to said first coherent wavelength converter and to said second coherent wavelength converter and producing an output proportional to said first coherent pulsed output correlated with said second coherent pulse output.

12. The optical pulse position modulation receiver according to claim 11 wherein said optical pulses of said clock signal are equally spaced or nearly equally spaced in time.

13. The optical pulse position modulation receiver according to claim 11 wherein said first coherent pulsed output is a stream of optical pulses with each pulse having a top-hat temporal shape and said second coherent pulsed output is a stream of pulses of optical pulses with each pulse having a top-hat temporal shape.

14. The optical pulse position modulation receiver according to claim 11 wherein said output of said coherent correlator is linearly proportional to the difference in time between a pulse in said pulse position modulated signal and an optical clock pulse synchronized to said pulse in said pulse position modulated signal.

15. The optical pulse position modulation receiver according to claim 11 wherein said optical signal demultiplexer comprises a wavelength division multiplexer/demultiplexer.

16. The optical pulse position modulation receiver according to claim 11 wherein said first coherent wavelength converter comprises a first non-linear optical loop mirror and said second coherent wavelength converter comprises a second nonlinear optical loop mirror.

17. The optical pulse position modulation receiver according to claim 16 further comprising:

a first optical filter coupled to an output of said first non-linear optical loop mirror; and a second optical filter coupled to an output of said second non-linear optical loop mirror.

18. The optical pulse position modulation receiver according to claim 11 wherein said coherent correlator comprises:

a 50/50 coupler with two inputs and two outputs;

a balanced detector having inputs coupled to said two outputs of said 50/50 coupler and having an output; and, an optical phase shifter having an input and an output, said output of said optical phase shifter connected to one of said two inputs of said 50/50 coupler, said optical phase shifter providing a phase shift controlled by said output of said balanced detector.

19. The optical pulse position modulation receiver according to claim 11 further comprising:

an optical limiter, said optical limiter having an input coupled to said first optical demultiplexer output and an output connected to said first input of said first coherent wavelength converter.

20. The optical pulse position modulation receiver according to claim 19 further comprising:

an optical amplifier, said optical amplifier connected between said output of said optical limiter and said first input of said first coherent wavelength converter.

21. The optical pulse position modulation receiver according to claim 11 further comprising:

an optical clock recovery means, said optical clock recovery means providing rectification and amplification of said clock signal and having an input coupled to said second optical demultiplexer output and producing an output connected to said first input of said second coherent wavelength converter.

22. The optical pulse position modulation receiver according to claim 11 further comprising:

an optical amplifier, said optical amplifier coupled to said means for coupling an optical signal into said receiver and producing an output connected to said optical signal demultiplexer.

23. The optical pulse position modulation receiver according to claim 11 wherein said means for coupling an optical signal to said receiver comprises a fiber coupler.

24. The optical pulse position modulation receiver according to claim 11 wherein said means for coupling an optical signal to said receiver comprises an optical lens.

25. A method for detecting a pulse position modulated optical signal comprising the steps of:

receiving said pulse position modulated optical signal;

providing a stream of optical clock pulses;

generating a continuous wave optical signal;

applying said continuous wave optical signal to a first coherent wavelength generator;

providing said pulse position modulated optical signal to said first coherent wavelength generator;

controlling said first coherent wavelength generator with said pulse position modulated optical signal so as to produce a first coherent pulse stream;

applying said continuous wave optical signal to a second coherent wavelength generator;

providing said stream of optical clock pulses to said second coherent wavelength generator;

controlling said second coherent wavelength generator with said stream of optical clock pulses so as to produce a second coherent pulse stream; and cross-correlating said first coherent pulse stream with said second coherent pulse stream to produce an output.

26. The method according to claim 25 wherein said stream of optical clock pulses comprises optical pulses equally spaced or nearly equally spaced in time.

27. The method according to claim 25 wherein said step of providing a stream of optical clock pulses comprises:

splitting said stream of optical clock pulses from said pulse position modulated optical signal.

28. The method according to claim 25 wherein said first coherent pulse stream produced in said step of controlling said first coherent wavelength generator with said pulse position modulated signal comprises a stream of optical pulses with a top-hat temporal shape and said second coherent pulse stream produced in said step of controlling said second coherent wavelength generator with said stream of optical clock pulses comprises a stream of optical pulses with a top-hat temporal shape.

29. The method according to claim 25 wherein said step of cross-correlating said first coherent pulse stream with said second coherent pulse stream produces an output that is linearly proportional to the difference in time between a pulse in said pulse position modulated signal and an optical clock pulse synchronized to said pulse in said pulse position modulated signal.

30. The method according to claim 25 wherein the step of receiving said pulse position modulated signal further comprises:

amplifying said pulse position modulated optical signal.

31. The method according to claim 25 wherein said step for providing said pulse position modulated signal to said first coherent wavelength generator comprises the steps of:

regenerating said pulse position modulated signal to create a regenerated pulse position modulated signal; and providing said regenerated pulse position modulated signal to said first coherent wavelength generator.

32. The method according to claim 25 wherein said step for providing said stream of optical clock pulses to said second coherent wavelength generator comprises the steps of:

regenerating said stream of optical clock pulses to create a regenerated clock signal of optical pulses; and providing said regenerated clock signal of pulses to said second coherent wavelength generator.

33. An apparatus for detecting temporal displacement between optical pulses in a first optical signal and optical pulses in a second optical signal wherein said first optical signal is synchronized with said second optical signal, said apparatus comprising:

a continuous wave optical source producing a continuous wave optical signal;

a first coherent wavelength converter, said first coherent wavelength converter having a first input responsive to said first optical signal and a second input responsive to said continuous wave optical signal and producing a first coherent pulsed output;

a second coherent wavelength converter, said second coherent wavelength converter having a first input coupled to said second optical signal and a second input coupled to said continuous wave optical signal and producing a second coherent pulsed output; and a coherent correlator having inputs coupled to the outputs of said first coherent wavelength converter and of said second coherent wavelength converter and producing an output proportional to said first coherent pulsed output correlated with said second coherent pulse output.

34. A method for detecting temporal displacement between optical pulses in a first optical signal and optical pulses in a second optical signal wherein said first optical signal is synchronized with said second optical signal, said method comprising the steps of:

generating a continuous wave optical signal;

applying said continuous wave optical signal to a first coherent wavelength generator;

providing said first optical signal to said first coherent wavelength generator;

controlling said first coherent wavelength generator with said first optical signal so as to produce a first coherent pulse stream;

applying said continuous wave optical signal to a second coherent wavelength generator;

providing said second optical signal to said second coherent wavelength generator;

controlling said second coherent wavelength generator with said second optical signal so as to produce a second coherent pulse stream; and cross-correlating said first coherent pulse stream with said second coherent pulse stream to produce an output.

* * * * *